United States Patent
Ramesh et al.

(10) Patent No.: US 11,917,741 B2
(45) Date of Patent: Feb. 27, 2024

(54) RELIABLE WIRELESS DALI CONTROLLER WITH REAL-TIME RESPONSE AND EXTENDED ADDRESSING

(71) Applicant: Analog Devices International Unlimited Company, Limerick (IE)

(72) Inventors: Pratik Ramesh, Bengaluru (IN); Sreeharsha Harohalli Srinivas, Bangalore (IN)

(73) Assignee: Analog Devices International Unlimited Company, Limerick (IE)

( * ) Notice: Subject to any disclaimer, the term of this patent is extended or adjusted under 35 U.S.C. 154(b) by 327 days.

(21) Appl. No.: 17/493,391

(22) Filed: Oct. 4, 2021

(65) Prior Publication Data

US 2022/0132642 A1 Apr. 28, 2022

Related U.S. Application Data

(60) Provisional application No. 63/104,351, filed on Oct. 22, 2020.

(51) Int. Cl.
H05B 47/19 (2020.01)
H05B 47/155 (2020.01)

(52) U.S. Cl.
CPC ........... *H05B 47/19* (2020.01); *H05B 47/155* (2020.01)

(58) Field of Classification Search
None
See application file for complete search history.

(56) References Cited

U.S. PATENT DOCUMENTS

| | | | |
|---|---|---|---|
| 7,548,150 B2 | 6/2009 | Huber et al. | |
| 8,072,164 B2 | 12/2011 | Ilyes et al. | |
| 2013/0119894 A1 | 5/2013 | Yeh et al. | |
| 2013/0249442 A1* | 9/2013 | Piper | H05B 47/18 315/312 |
| 2013/0264971 A1 | 10/2013 | Yeh et al. | |
| 2014/0139140 A1 | 5/2014 | Yeh et al. | |
| 2015/0084547 A1 | 3/2015 | Yeh et al. | |
| 2015/0223308 A1 | 8/2015 | Yen | |
| 2019/0150253 A1 | 5/2019 | Shepherd | |

FOREIGN PATENT DOCUMENTS

EP 3855871 A1 * 7/2021

* cited by examiner

*Primary Examiner* — Dedei K Hammond
(74) *Attorney, Agent, or Firm* — Schwegman Lundberg & Woessner, P.A.

(57) ABSTRACT

A controller for a wireless digital addressable lighting interface (DALI) compatible system comprises physical layer circuitry configured to communicate information wirelessly with one or more secondary devices of the DALI system, and processing circuitry operatively coupled to the physical layer circuitry. The processing circuitry is configured to encode a forward packet to be sent to a secondary device of the one or more secondary devices. The forward packet includes an extended address that includes an address of the secondary device and an address of a DALI luminary device of the DALI system connected to the secondary device.

21 Claims, 3 Drawing Sheets

RELIABLE WIRELESS DALI CONTROLLER WITH REAL-TIME RESPONSE AND EXTENDED ADDRESSING

CLAIM OF PRIORITY

This application claims the benefit of priority to U.S. Provisional Application Ser. No. 63/104,351, filed Oct. 22, 2020, which is hereby incorporated by reference herein in its entirety.

BACKGROUND

Digital addressable lighting interface (DALI) systems provide network-based control of lighting in building automation. In a DALI system, lighting devices such as electrical ballasts for fluorescent lighting and drivers for light emitting diodes are controlled using a DALI protocol. A DALI system typically includes a control unit connected to input devices such as sensors and switches and the lighting devices to be controlled. The control unit is connected to the input devices and the lighting devices through a wired DALI bus. There are advantages to implementing a wireless DALI system.

SUMMARY OF THE DISCLOSURE

This document relates generally to digital addressable lighting interface systems and methods of their operation. An example of a method of operating a wireless digital addressable lighting interface (DALI) compatible system comprises transmitting, by a wireless controller of the wireless DALI compatible system, a forward packet to a secondary device of the wireless DALI compatible system, wherein the forward packet includes an extended address identifying the secondary device, determining, by the secondary device using the extended address, a luminary address for a DALI luminary device operatively coupled to the secondary device by a wired DALI bus; and sending, by the secondary device, the forward packet to the DALI luminary device.

An example of a controller for a wireless DALI compatible system comprises physical layer circuitry configured to communicate information wirelessly with one or more secondary devices of the DALI system, and processing circuitry operatively coupled to the physical layer circuitry. The processing circuitry is configured to encode a forward packet to be sent to a secondary device of the one or more secondary devices. The forward packet includes an extended address that includes an address of the secondary device and an address of a DALI luminary device of the DALI system connected to the secondary device.

An example of a secondary device for a wireless DALI compatible system comprises physical layer circuitry configured to communicate information wirelessly with a DALI controller of the wireless DALI compatible system; a DALI bus interface to a wired DALI bus, wherein the DALI bus connects one or more DALI luminary devices to the secondary device; and processing circuitry operatively coupled to the physical layer circuitry and the DALI bus interface. The processing circuitry is configured to decode a forward packet that includes an extended address identifying the secondary device; decode a luminary address for a DALI luminary device connected to the wired DALI bus; and forward a standard DALI packet included in the forward packet to the DALI luminary device.

This section is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
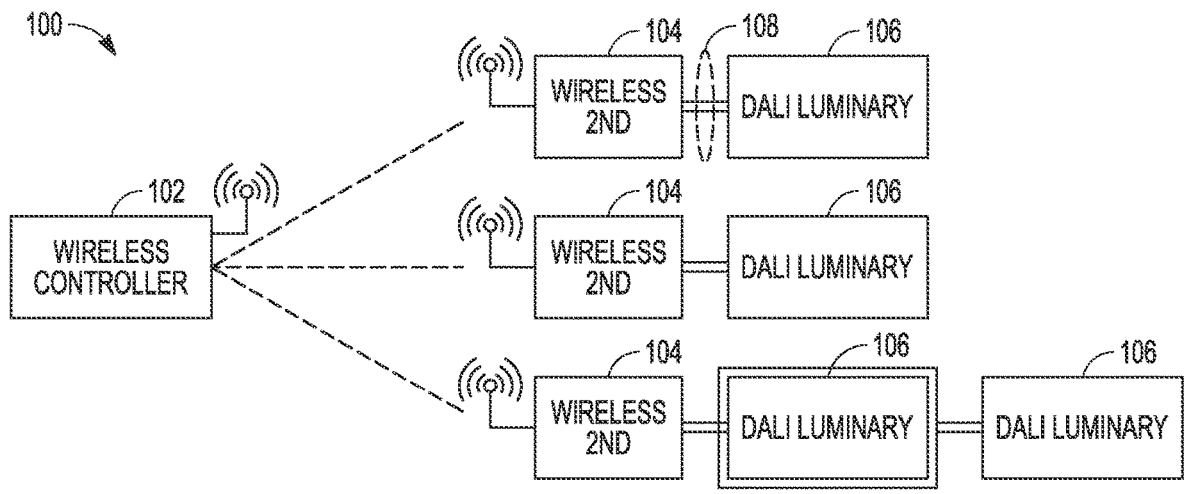
FIG. 1 is a block diagram of portions of an example of a wireless DALI compatible system.

A DALI network for building automation typically consists of a DALI controller that plays the role of a primary controller that connects to secondary DALI luminary devices using a two-wired DALI bus typically in a star network.

The wired DALI bus needs to be pulled up to a voltage of 9.5 to 22.5 volts. The length of the wired DALI bus is limited to 300 meters (300 m) when using standard 1.5 square millimeter (1.5 sqmm) wire. This is because the maximum tolerable voltage drop along the bus is 2 volts. Once the wiring of the hardware is complete, a commissioning process is performed. In the commissioning process, the DALI controller assigns a unique DALI short address (6 address bits) to each of the luminary connected to the two-wire bus, with a maximum of 64 devices connected to the bus.

Once the commissioning process is complete the DALI controller can send a DALI forward packet (16 bits long). The DALI forward packet is a command issued from the DALI controller to the DALI luminary. A DALI forward packet includes the 6-bit DALI address and an 8-bit DALI command. For certain DALI commands the luminary replies to the DALI controller with a backward packet (8 bits long). This backward packet must reach the DALI controller in under 9.17 milliseconds (9.17 ms) from the time the DALI forward packet was issued.

A wireless DALI network would provide a centralized wireless lighting management system that controls luminary devices and receives wireless diagnostic data back from the luminary devices.

FIG. 1 is a block diagram of portions of an example of a wireless DALI compatible system 100. The system includes a wireless controller 102 and one or more secondary devices 104 that have a wireless interface. The controller and the secondary devices communicate information wirelessly.

Each secondary device includes a bus interface to a DALI bus. One or more DALI luminary devices 106 is connected to each secondary device via a two-wire DALI bus 108.

Figure 2:
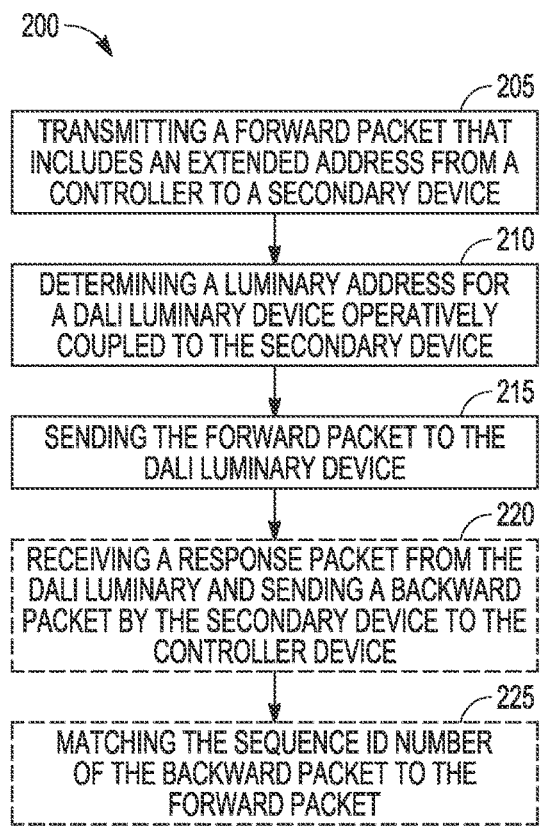
FIG. 2 is a flow diagram of an example of a method of operating a wireless DALI compatible system.

FIG. 2 is a flow diagram of a method of operating a wireless DALI compatible system such as the example wireless DALI compatible system of FIG. 1. At block 205, a wireless controller of the DALI system transmits a forward packet to a secondary device of the DALI system. The forward packet may be transmitted using any wireless protocol, such as a WiFi protocol or Bluetooth® protocol for example. The forward packet includes an extended address and a DALI luminary address. The extended address can be used to select a secondary device of interest and the DALI luminary address can be used to select a DALI luminary device connected to the secondary device.

Figure 3A:
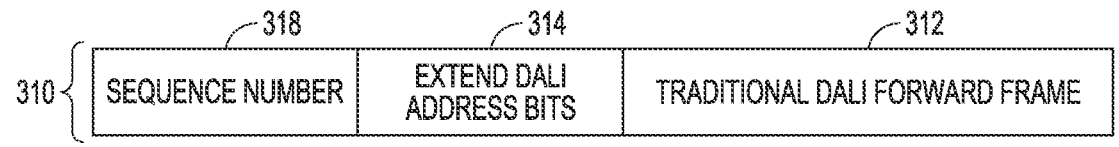
FIG. 3A is a diagram of an example of a forward packet for a wireless DALI compatible system.

FIG. 3A is a diagram of an example of a wireless forward packet 310. The forward packet 310 includes a DALI forward frame 312 that includes a DALI command and the address of the DALI luminary. The forward packet 310 also includes an extended address 314. The addressing of the forward packet can be viewed as a two-part addressing in which the first part includes the address of the secondary device and the second part includes the address of the DALI luminary device. The extended address 314 identifies the secondary device. The DALI forward frame includes the address of the DALI luminary device. While traditional DALI controllers are limited to connect with only 64 DALI devices, the wireless controller can have any number of secondary devices as supported by the wireless network. Each secondary device can connect up to 64 DALI luminaries.

Returning to FIG. 2, at block 210 the secondary device determines an address of a DALI luminary device from the wireless DALI forward packet 310. The processing circuitry of the secondary device may remove the sequence number and the extended address from the packet and forward a DALI packet that includes the address of the DALI luminary device.

The DALI luminary is connected to the wireless secondary device by a wired DALI bus. At block 215, the secondary device sends a DALI packet to the DALI luminary device. The DALI luminary device performs or executes the DALI command included in the forward packet. The DALI command may change an operating parameter of the DALI luminary device, such as to change a light intensity of the luminary device for example. In another example, the DALI command may include a request for status information from the DALI luminary device.

Optionally, at block 220 the DALI luminary returns a response to the command (e.g., a response packet) to the secondary device using the wired DALI bus, but the command may not require a response and no response may be sent in these cases. Optionally, the secondary device adds a sequence identification (ID) number to the response and sends a wireless backward packet to the wireless controller using the wireless protocol. At block 225, the wireless controller matches the sequence ID number of the backward packet to the forward packet and stores the response of the associated DALI luminary.

Figure 3B:
FIG. 3B is a diagram of an example of a backward packet for a wireless DALI compatible system.

FIG. 3B is a diagram of an example of a backward packet 316 that can be used in a wireless DALI compatible system. The forward packet 310 and the backward packet 316 can include the optional sequence ID number 318 to match the backward packet to the forward packet. The backward packet 316 includes a backward frame 320 that can include a response field with the response from the DALI luminary device.

If multiple DALI commands were sent out using wireless forward packets, there is a possibility that the backward packets are received in a different order from the order in which they were sent. The sequence ID number helps the controller to map the wireless forward packet/query with the correct wireless backward packet/response.

If the DALI command sent in the forward packet does not require a response, the response field of the backward packet can be left empty. The backward packet may only include the sequence ID number. Sending the backward packet with a sequence ID number that matches sequence ID number of the forward packet can serve as an acknowledge to the wireless controller that the forward packet has been received and implemented.

In some aspects, the DALI controller implements a timeout for a response to a forward packet. If the matching wireless backward packet is not received within a specified time out duration, the wireless DALI controller resends the forward packet to the secondary device. Thus, the timeout for packets with matching sequence ID numbers provides an acknowledgment mechanism that can improve reliability of communication between the wireless controller and DALI luminary devices.

Figure 4:
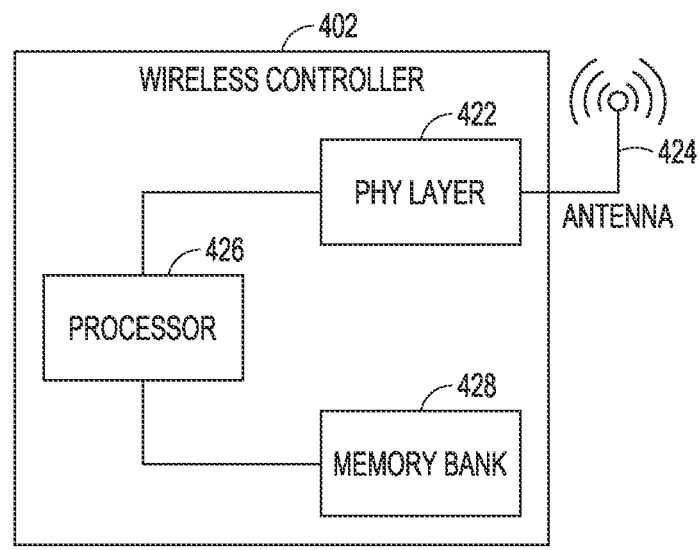
FIG. 4 is a block diagram of an example of portions of a wireless DALI controller of a wireless DALI compatible system.

FIG. 4 is a block diagram of an example of portions of a wireless controller 402 of a wireless DALI compatible system, such as the wireless controller 102 of FIG. 1. The wireless controller 402 includes physical layer circuitry 422 operatively coupled to an antenna 424. The physical (PHY) layer circuitry 422 communicates information wirelessly with one or more secondary devices of the wireless DALI compatible system. The wireless controller 402 also includes processing circuitry 426. The processing circuitry 426 can include one or more field programmable gate arrays (FPGAs), one or more application specific integrated circuits (ASICs), or one or more processors (e.g., microprocessors) executing instructions in firmware or software to implement the functions described.

The wireless controller 402 can include a port (e.g., a communication port or COMM port) to connect the wireless controller to a personal computer (PC) to interface with a software graphical user interface (GUI) of the PC. In variations, the wireless controller 402 can be a standalone device that works independently of a PC. The wireless controller 402 can transmit commands to set parameters of luminary DALI devices (e.g., to control light intensity) and to request diagnostic data from luminary devices (e.g., to determine if one or more of a battery, a battery charging circuit, a power supply, and a lamp of a luminary device are in working condition).

To send a command or request information, the processing circuitry 426 encodes a wireless forward packet (e.g., the forward packet of the example of FIG. 3A) to be sent to a secondary device of the wireless DALI compatible system. As explained previously herein, the encoding includes an extended address. The extended address is used to address the secondary device and the forward packet includes the address of a DALI luminary device connected to the wireless secondary device. In some examples, the controller maintains a reference table of the DALI luminaries connected to secondary devices of the wireless DALI system. A DALI luminary device is referenced with the extended addressing of the secondary device and a DALI luminary device address. The address of the DALI luminary device may be appended to the address of the secondary device. For instance, the address of the DALI luminary device may be stored as the least significant bits appended to the extended address. The encoding includes a sequence ID number in the forward packet.

The processing circuitry 426 decodes a backward packet received from the wireless secondary device, including decoding the sequence ID number of the backward packet. The backward packet may include response information from the DALI luminary device. The processing circuitry 426 maps the response information included in the backward packet to the DALI luminary device using the sequence ID number.

The wireless DALI controller 402 includes memory 428 integral to or operatively connected to the processing circuitry 426. The processing circuitry 426 stores a table in the memory that includes the extended address of the secondary device appended with the DALI address of the DALI Luminary connected to the respective secondary device. This extended address may be the medium access control (MAC) layer address of the secondary device. The extended address and the DALI address allow the wireless controller to send forward packets to the DALI luminary via the associated secondary device.

In some aspects, the wireless DALI controller 402 performs a discovery phase to identify the wireless secondary devices, and commission addresses to the DALI luminary devices connected to the secondary devices. The processing circuitry 426 initiates sending of one or more discovery packets using the wireless protocol and decodes responses to the discovery packets. A response packet sent by a wireless secondary device may be a backward packet that includes the MAC address of the wireless secondary device. Using the received MAC addresses the processing circuitry 426 may generate a data structure in the memory that includes the MAC address of the secondary device. The response packet may also include information identifying one or more DALI luminary devices connected to the secondary device using the wired DALI bus.

The data structure may include a list of the MAC layer addresses of all the available secondary devices appended with the addresses of the available DALI luminaries connected to the respective secondary devices. Each element in the list may have an associated index value. As part of the discovery/commissioning process, the wireless DALI controller 402 may send a forward packet that includes a command to instruct the secondary devices to assign a DALI address to its associated DALI luminary device or devices.

This method of commissioning the devices of the wireless DALI network minimizes the number of transactions between the wireless DALI controller and the wireless secondary device, thus helping to reduce traffic on the wireless DALI network and enabling quick commissioning. A request-approval mechanism would require a minimum of two packets (one request and one approval packet) on a per DALI luminary device basis. The technique described herein uses only two packets (one request packet and one address assignment packet) on a per wireless secondary device basis. Once the commissioning is complete, the wireless DALI controller can issue a wireless forward packet to the wireless secondary device which forwards the packet to the DALI luminary device via the wired DALI bus.

In some aspects, the processing circuitry 426 times a timeout duration for a response to a wireless forward packet sent to a secondary device. The wireless forward packets and backward packet that respond to the forward packets are identified by the sequence ID number. The processing circuitry 426 may initiate sending multiple packets before receiving a response. The processing circuitry 426 may monitor more than one forward packet for timeout. The timeout duration can be programmable.

Traditional wired DALI controllers or wired DALI systems expect a reply within 9.17 ms after which they timeout. The timeout duration in the wireless controller can be programmed (e.g., a few seconds) based on the latency of the wireless network protocol being used. Specifying a 9.17 ms timeout for a wireless network would be difficult for most wireless protocols. Using a programmable timeout and monitoring multiple packets for timeouts using the sequence ID number provides a real time or near real time response to the forward packets from the DALI luminary devices.

Another approach would be to cache or buffer the responses from luminary devices. The secondary device periodically sends the responses to the controller where the responses are buffered. This avoids sending and receiving wireless packets that can involve a high amount of latency. However, this buffering approach does not provide real time or near real time responses to the forward packets because of the buffering.

Figure 5:
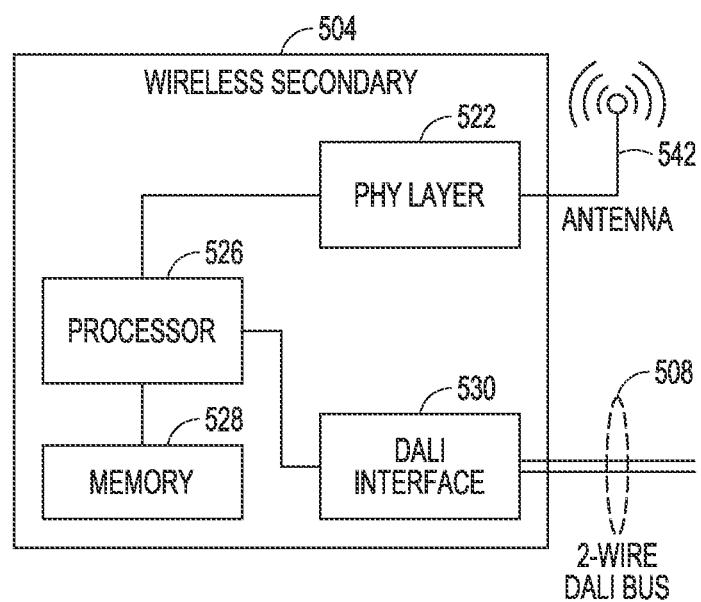
FIG. 5 is a block diagram of an example of portions of a wireless secondary device of a wireless DALI compatible system.

FIG. 5 is a block diagram of an example of portions of a wireless secondary device 504 of a wireless DALI compatible system, such as the wireless secondary device 104 of FIG. 1. The wireless secondary device 504 includes physical layer circuitry operatively coupled to an antenna 524 to communicate information wirelessly with the wireless controller. The wireless secondary device 504 also includes a wired interface. The wired interface is a DALI bus interface 530 connected to a wired DALI bus 508. The DALI bus 508 connects one or more DALI luminary devices to the wireless secondary device 504. The wireless secondary device 504 may have a DALI power supply built in to pull up the DALI bus to the required voltage based on electrical standards for a wired DALI network. Because the wired DALI bus is connected to the wireless secondary device, the wireless controller does not need a DALI power supply. This may result in lower cost compared to a wired DALI controller solution.

The wireless secondary device 504 includes processing circuitry 526 that decodes a forward packet from the wireless controller. The decoding includes decoding an extended address included in the forward packet that identifies the wireless secondary device 504, and may include decoding a sequence ID number associated with the forward packet. The processing circuitry 526 forwards a packet to the DALI luminary device via the wired DALI bus 508. The packet forwarded to the DALI luminary device can be a standard DALI packet that includes a DALI command.

The DALI luminary device receives the forward packet and responds based on the corresponding DALI command. The response from the DALI luminary device is received by the wireless secondary device 504 and the processing circuitry 526 of the secondary device encodes a backward packet to send to the DALI controller. The encoded backward packet includes the sequence ID number received in the forward packet. The backward packet may include response information from a DALI luminary device. If the command sent by the DALI controller does not require a response, the backward packet may be sent to provide an acknowledgement to the receiving and processing of the DALI command.

As explained previously herein, the devices of the combined wireless/wired DALI network perform a commissioning process. As part of the process, each of the secondary devices performs a scan of the wired DALI bus connected to the secondary device to detect the DALI devices connected to the wired DALI bus 508. The DALI luminary information may be stored in memory 528. The wireless secondary device 526 receives a discovery packet via the physical layer circuitry 522 and the processing circuitry 526 decodes the discovery packet. The processing circuitry 526 encodes a discovery response packet to send to the wireless controller. The discovery response packet includes a medium access control (MAC) layer address of the secondary device and information identifying one or more DALI luminary devices connected to the secondary device by the wired DALI bus 508. The wireless secondary device 504 receives address information from the DALI controller to commission the DALI luminary devices connected to the secondary device.

The devices, methods and systems described herein can be used to implement a wireless DALI compatible network. Responses from DALI luminary devices of the wireless DALI compatible network are received by a wireless controller of the network in real time or near real time. The time out for communications between the wireless controller and wireless secondary devices is adjustable so that the wireless DALI network can support timing of different wireless communication protocols. Communication between the wireless controller and wireless secondary devices can include an acknowledgement mechanism to provide a reliable communication link.

ADDITIONAL DESCRIPTION AND ASPECTS

A first Aspect (Aspect 1), includes subject matter (such as a controller for a wireless digital addressable lighting interface (DALI) compatible system) comprising physical layer circuitry configured to communicate information wirelessly with one or more secondary devices of the wireless DALI compatible system and processing circuitry operatively coupled to the physical layer circuitry. The processing circuitry is configured to encode a forward packet to be sent to a secondary device of the one or more secondary devices, wherein the forward packet includes an extended address that includes an address of the secondary device and an address of a DALI luminary device connected to the secondary device.

In Aspect 2, the subject matter of Aspect 1 optionally includes processing circuitry configured to include a sequence identification (ID) number in the forward packet, decode the sequence ID number in a backward packet received from the secondary device, and map response information included in the backward packet to the DALI luminary device using the sequence ID number.

In Aspect 3, the subject matter of Aspect 2 optionally includes memory processing circuitry configured to store a two-part address in the memory for the one or more secondary devices, wherein the two-part address includes a medium access control (MAC) layer address of a secondary device appended with an address of a DALI luminary device connected to the secondary device.

In Aspect 4, the subject matter of one or both of Aspects 2 and 3 optionally includes processing circuitry configured to time a timeout duration for a response to a forward packet identified by the sequence ID number, wherein the timeout duration is programmable.

In Aspect 5, the subject matter of one or any combination of Aspects 1-2 optionally include memory and processing circuitry configured to initiate sending of one or more discovery packets, decode a response to the discovery packet sent by the secondary device, wherein the response includes a medium access control (MAC) layer address of the secondary device, and generate a data structure in the memory that includes the MAC layer address of the secondary device appended with the address of the DALI luminary device.

In Aspect 6, the subject matter of Aspect 5 optionally includes processing circuitry configured to decode a response to the discovery packet that identifies one or more DALI luminary devices operatively coupled to the secondary device.

In Aspect 7, the subject matter of one or both of Aspects 5 and 6 optionally includes processing circuitry configured to send forward packets to secondary devices that responded to the one or more discovery packets to assign DALI addresses to the DALI luminary devices connected to the secondary devices.

In Aspect 8, the subject matter of one or any combination of Aspects 1-7 optionally includes processing circuitry configured to send a forward packet that includes a command to set a light intensity of the DALI luminary device.

In Aspect 9, the subject matter of one or any combination of Aspects 1-8 optionally includes processing circuitry configured to send forward packet that includes a request for status information from the DALI luminary device.

Aspect 10 can include subject matter (such as a method of operating a wireless DALI compatible system) or can optionally be combined with one or any combination of Aspects 1-9 to include such subject matter, comprising transmitting, by a wireless controller of the wireless DALI compatible system, a forward packet to a secondary device of the wireless DALI compatible system, wherein the forward packet includes an extended address identifying the secondary device, determining, by the secondary device using the forward packet, a luminary address for a DALI luminary device operatively coupled to the secondary device by a wired DALI bus, and sending, by the secondary device, the forward packet to the DALI luminary device.

In Aspect 11, the subject matter of Aspect 10 optionally includes receiving by the secondary device, a response from the DALI luminary, and sending, by the secondary device a backward packet to the wireless controller, wherein the transmitting the forward packet includes sending a forward packet that includes a sequence identification (ID) number, and the backward packet includes the same sequence ID number.

In Aspect 12, the subject matter of Aspect 11 optionally includes mapping, by the wireless controller, the backward packet to the secondary device and the DALI luminary device using the sequence ID number.

In Aspect 13, the subject matter of one or any combination of Aspects 10-12 optionally includes scanning, by the wireless controller, the wireless DALI system for secondary devices; scanning, by the secondary device, the DALI bus for DALI luminary devices; and sending, by the secondary device, information to the wireless controller on one or more DALI luminary devices detected on the DALI bus.

In Aspect 14, the subject matter of Aspect 13 optionally includes generating, by the wireless controller, a data structure in the memory that includes the medium access control (MAC) layer address of the secondary device appended with the address of the DALI luminary devices connected to the secondary device.

In Aspect 15, the subject matter of one or both of Aspects 13 and 14 optionally includes the secondary device assigning the luminary address of the DALI luminary device included in the forward packet.

In Aspect 16, the subject matter of one or any combination of Aspects 10-15 optionally includes transmitting the forward packet to the secondary device with data to set a light intensity of the DALI luminary device.

In Aspect 17, the subject matter of one or any combination of Aspects 10-16 optionally includes transmitting the forward packet to the secondary device that includes a request for status information from the DALI luminary device.

In Aspect 18, the subject matter of one or any combination of Aspects 10-17 optionally includes powering the wireless controller using a power source separate from a power source of DALI luminary devices of the wireless DALI compatible system.

Aspect 19 includes subject matter (such as a secondary device for a wireless DALI compatible system) comprising physical layer circuitry configured to communicate information wirelessly with a DALI controller of the wireless DALI compatible system, a DALI bus interface to a wired DALI bus that connects one or more DALI luminary devices to the secondary device, and processing circuitry configured to decode a forward packet that includes an extended address identifying the secondary device, decode a luminary address for a DALI luminary device connected to the wired DALI bus, and forward a DALI standard packet included in the forward packet to the DALI luminary device.

In Aspect 20, the subject matter of Aspect 19 optionally includes a DALI bus interface configured to receive a response to a DALI command included in the DALI standard packet from the DALI luminary device, and processing circuitry configured to encode a backward packet to send to the DALI controller. The encoded backward packet includes a sequence identification (ID) number included in the forward packet.

In Aspect 21, the subject matter of one or both of Aspects 19 and 20 optionally includes processing circuitry configured to decode a discovery packet received via the physical layer circuitry, and encode a discovery response packet that includes a medium access control (MAC) layer address of the secondary device and information identifying one or more DALI luminary devices connected on the DALI bus.

These several non-limiting Aspects can be combined in any permutation or combination. The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. Method examples described herein can be machine or computer-implemented at least in part.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A controller for a wireless digital addressable lighting interface (DALI) compatible system, the controller comprising:
    physical layer circuitry configured to communicate information wirelessly with one or more secondary devices of the wireless DALI compatible system; and
    processing circuitry operatively coupled to the physical layer circuitry, wherein the processing circuitry is configured to:
    encode a forward packet to be sent to a secondary device of the one or more secondary devices, wherein the forward packet includes an extended address that includes an address of the secondary device and an address of a DALI luminary device of the wireless DALI compatible system connected to the secondary device.

2. The controller of claim 1, wherein the processing circuitry is configured to:
    include a sequence identification (ID) number in the forward packet;
    decode the sequence ID number in a backward packet received from the secondary device; and
    map response information included in the backward packet to the DALI luminary device using the sequence ID number.

3. The controller of claim 2, including:
    a memory integral to or operatively connected to the processing circuitry; and
    wherein the processing circuitry is configured to:
    store a two-part address in the memory for the one or more secondary devices, wherein the two-part address includes a medium access control (MAC) layer address of a secondary device appended with an address of a DALI luminary device connected to the secondary device.

4. The controller of claim 2, wherein the processing circuitry is configured to time a timeout duration for a response to a forward packet identified by the sequence ID number, wherein the timeout duration is programmable.

5. The controller of claim 1,
    a memory integral to or operatively coupled to the processing circuitry;

wherein the processing circuitry is configured to:
  initiate sending of one or more discovery packets;
  decode a response to the discovery packet sent by the secondary device, wherein the response includes a medium access control (MAC) layer address of the secondary device; and
  generate a data structure in the memory that includes the MAC layer address of the secondary device appended with the address of the DALI luminary device.

6. The controller of claim 5, wherein the response to the discovery packet identifies one or more DALI luminary devices operatively coupled to the secondary device.

7. The controller of claim 5, wherein the processing circuitry is configured to send forward packets to secondary devices that responded to the one or more discovery packets to assign DALI addresses to the DALI luminary devices connected to the secondary devices.

8. The controller of claim 1, wherein the forward packet includes a command to set a light intensity of the DALI luminary device.

9. The controller of claim 1, wherein the forward packet includes a request for status information from the DALI luminary device.

10. A method of operating a wireless digital addressable lighting interface (DALI) compatible system, the method comprising:
  transmitting, by a wireless controller of the wireless DALI compatible system, a forward packet to a secondary device of the wireless DALI compatible system, wherein the forward packet includes an extended address identifying the secondary device;
  determining, by the secondary device using the forward packet, a luminary address for a DALI luminary device operatively coupled to the secondary device by a wired DALI bus; and
  sending, by the secondary device, a DALI standard packet included in the forward packet to the DALI luminary device.

11. The method of claim 10, including:
  receiving by the secondary device, a response from the DALI luminary; and
  sending, by the secondary device a backward packet to the wireless controller, wherein the transmitting the forward packet includes sending a forward packet that includes a sequence identification (ID) number, and the backward packet includes the same sequence ID number.

12. The method of claim 11, including mapping, by the wireless controller, the backward packet to the secondary device and the DALI luminary device using the sequence ID number.

13. The method of claim 10, including:
  scanning, by the wireless controller, the wireless DALI system for secondary devices;
  scanning, by the secondary device, the DALI bus for DALI luminary devices; and
  sending, by the secondary device, information to the wireless controller on one or more DALI luminary devices detected on the DALI bus.

14. The method of claim 13, including generating, by the wireless controller, a data structure in the memory that includes the medium access control (MAC) layer address of the secondary device appended with the address of the DALI luminary devices connected to the secondary device.

15. The method of claim 13, including the secondary device assigning the luminary address of the DALI luminary device included in the forward packet.

16. The method of claim 10, wherein the transmitting the forward packet includes transmitting the forward packet to the secondary device with data to set a light intensity of the DALI luminary device.

17. The method of claim 10, wherein the transmitting the forward packet includes transmitting the forward packet to the secondary device that includes a request for status information from the DALI luminary device.

18. The method of claim 10, including powering the wireless controller using a power source separate from a power source of DALI luminary devices of the wireless DALI compatible system.

19. A secondary device for a wireless digital addressable lighting interface (DALI) compatible system, the secondary device comprising:
  physical layer circuitry configured to communicate information wirelessly with a wireless controller of the wireless DALI compatible system;
  a DALI bus interface to a wired DALI bus, wherein the DALI bus connects one or more DALI luminary devices to the secondary device; and
  processing circuitry operatively coupled to the physical layer circuitry and the DALI bus interface, wherein the processing circuitry is configured to:
    decode a forward packet that includes an extended address identifying the secondary device;
    decode a luminary address for a DALI luminary device connected to the wired DALI bus; and
    forward a DALI standard packet included in the forward packet to the DALI luminary device.

20. The secondary device of claim 19,
  wherein the DALI bus interface is configured to receive a response to a DALI command included in the DALI standard packet from the DALI luminary device; and
  wherein the processing circuitry is configured to encode a backward packet to send to the wireless controller, wherein the encoded backward packet includes a sequence identification (ID) number included in the forward packet.

21. The secondary device of claim 19, wherein the processing circuitry is configured to:
  decode a discovery packet received via the physical layer circuitry; and
  encode a discovery response packet that includes a medium access control (MAC) layer address of the secondary device and information identifying one or more DALI luminary devices connected on the DALI bus.

* * * * *